B. A. PETERSON.
MAGAZINE LOADER.
APPLICATION FILED MAY 12, 1910.
1,061,492.
Patented May 13, 1913.
7 SHEETS—SHEET 1.
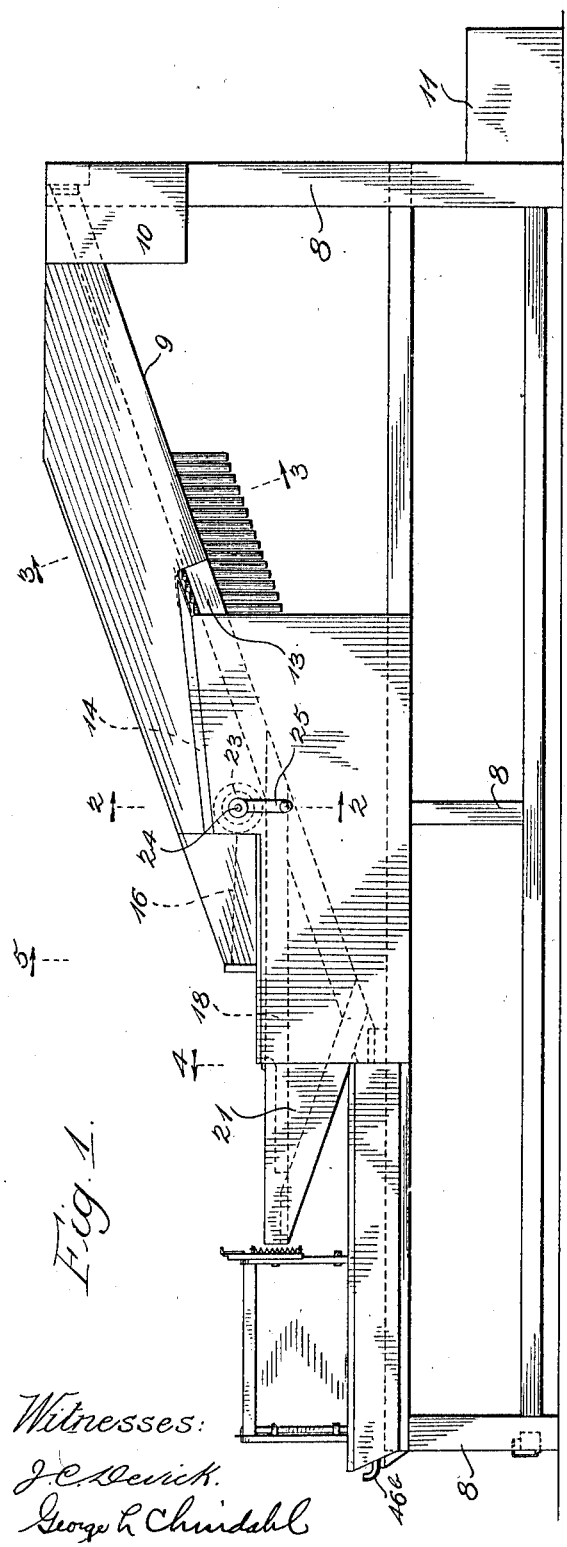
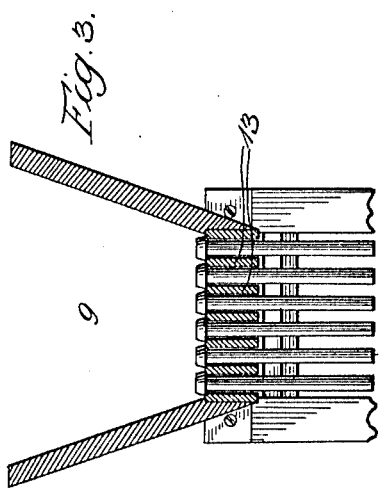
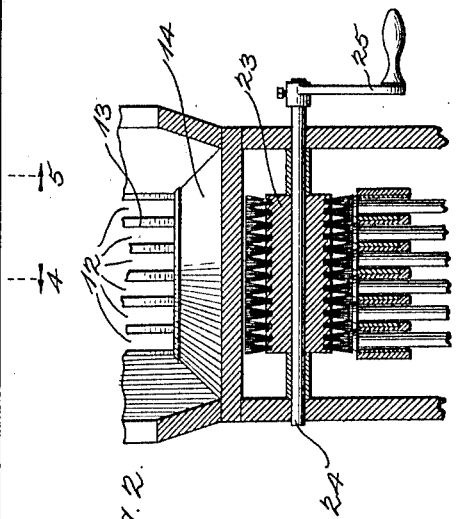
Witnesses:
J. C. Devick.
George L. Chrisdahl.
Inventor:
Burt A. Peterson
By Luther L. Miller
Attorney.

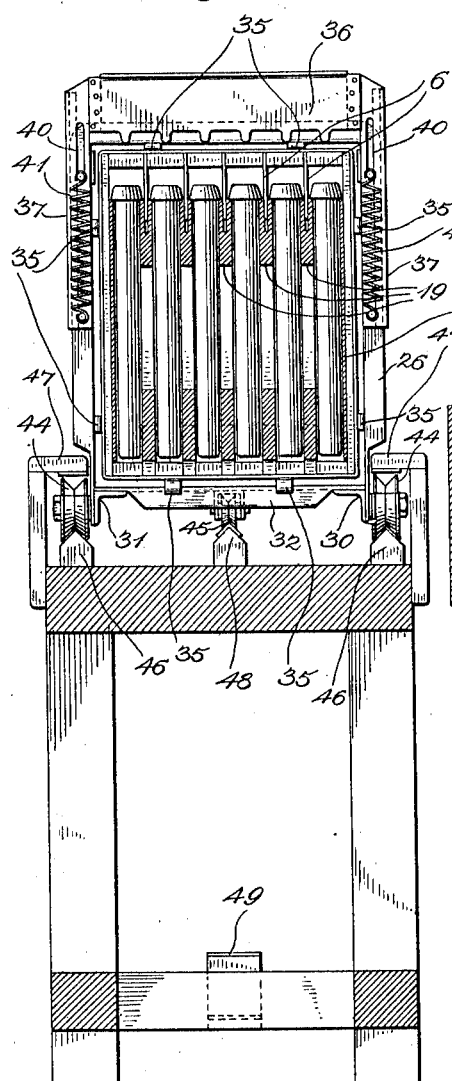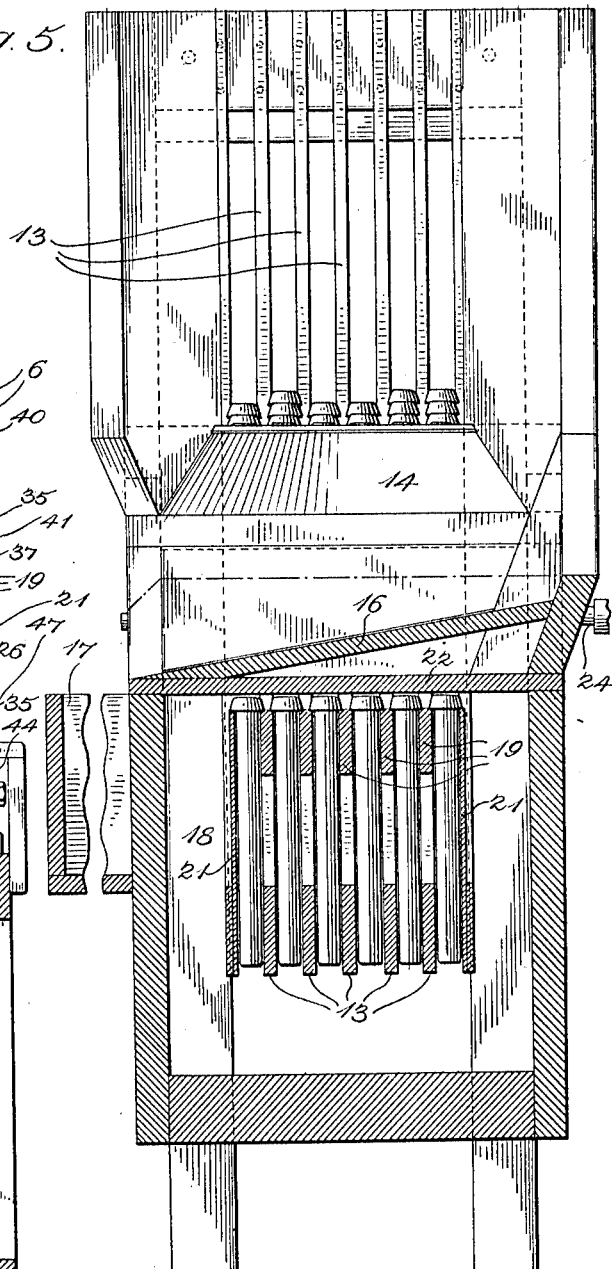

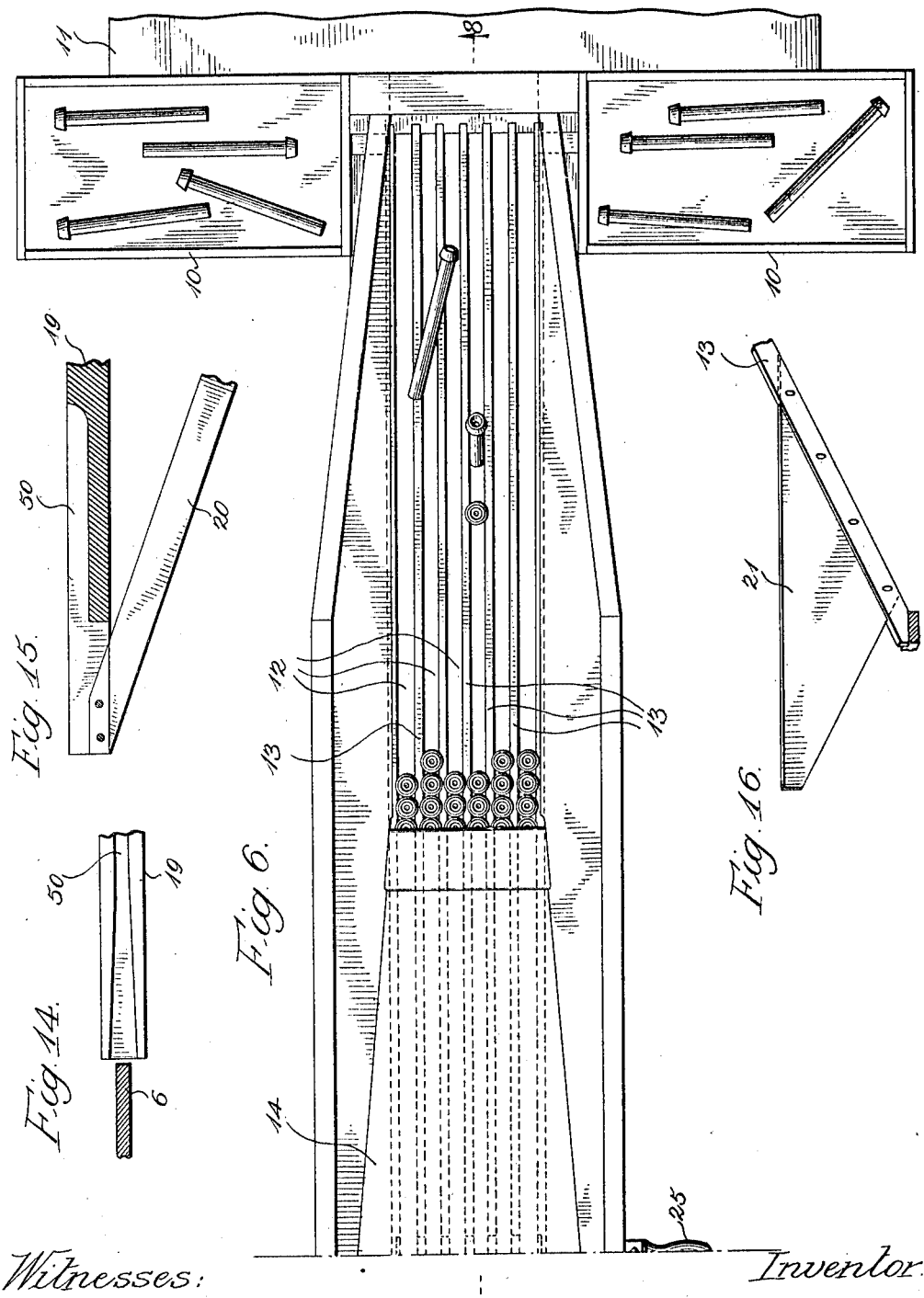

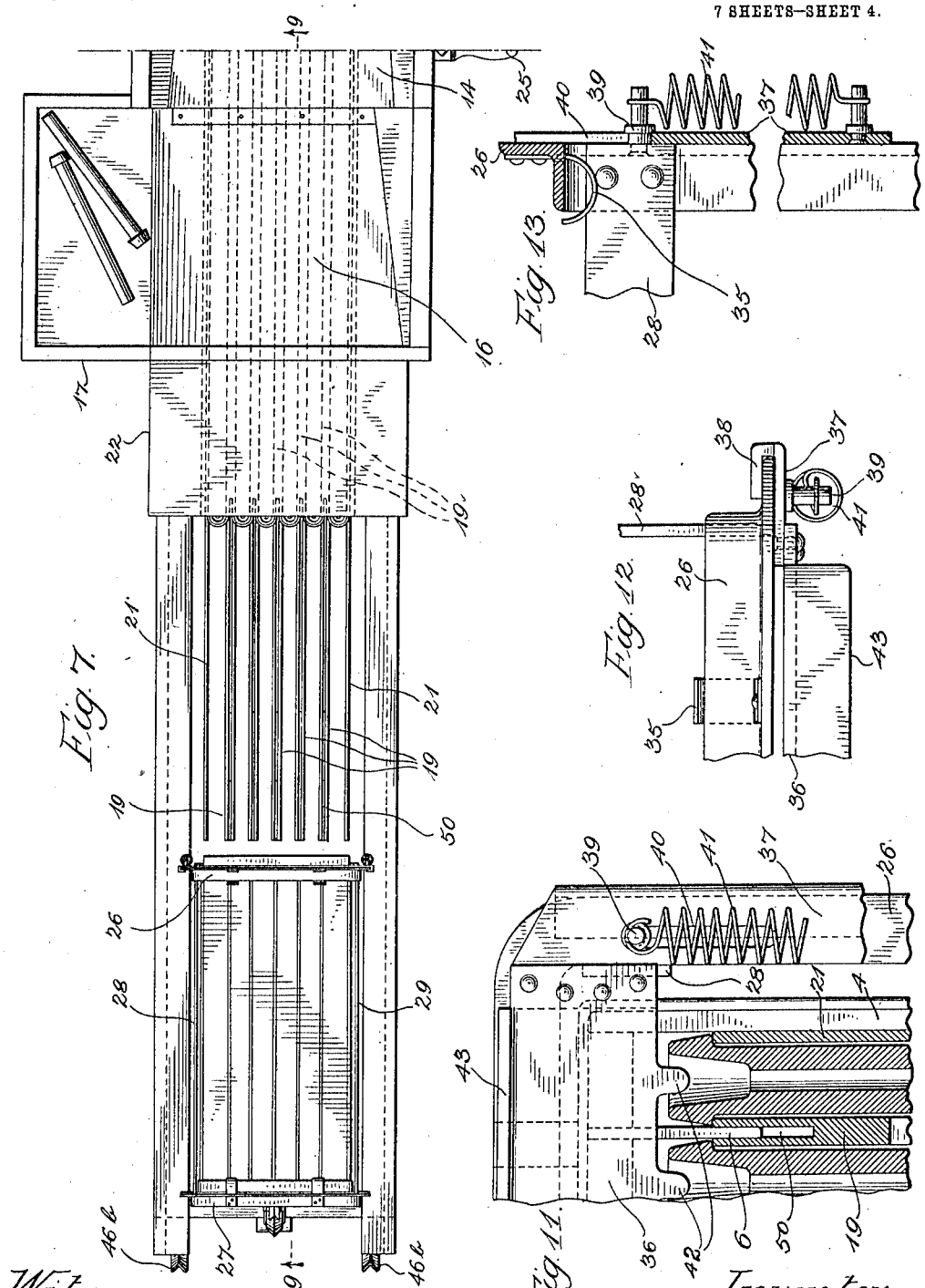

B. A. PETERSON.
MAGAZINE LOADER.
APPLICATION FILED MAY 12, 1910.
1,061,492.
Patented May 13, 1913.
7 SHEETS—SHEET 5.
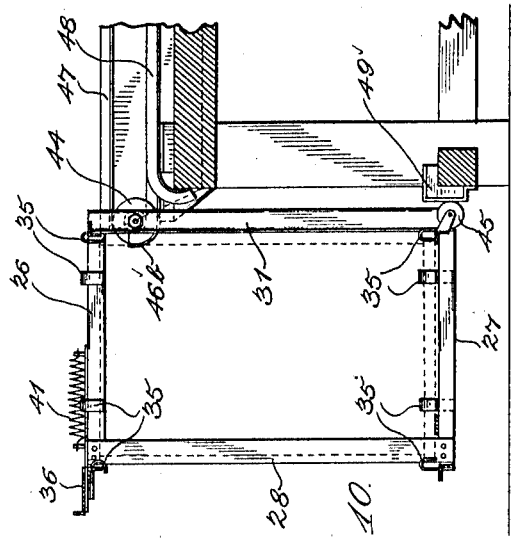
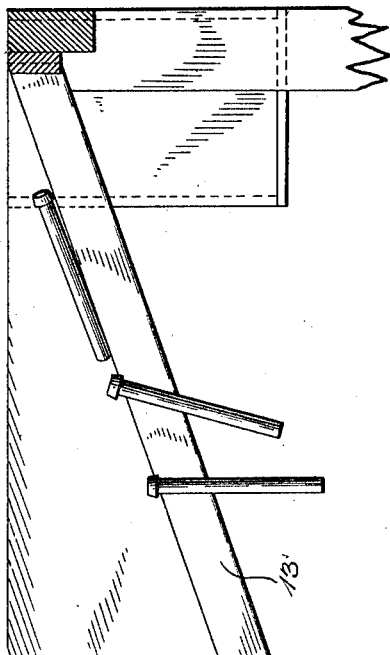
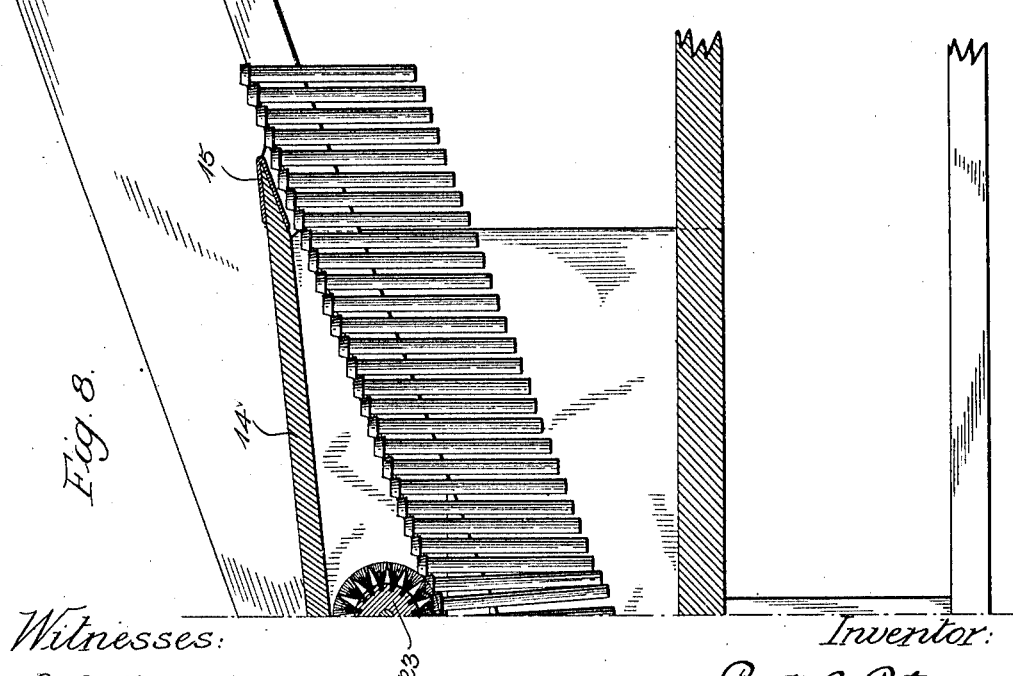

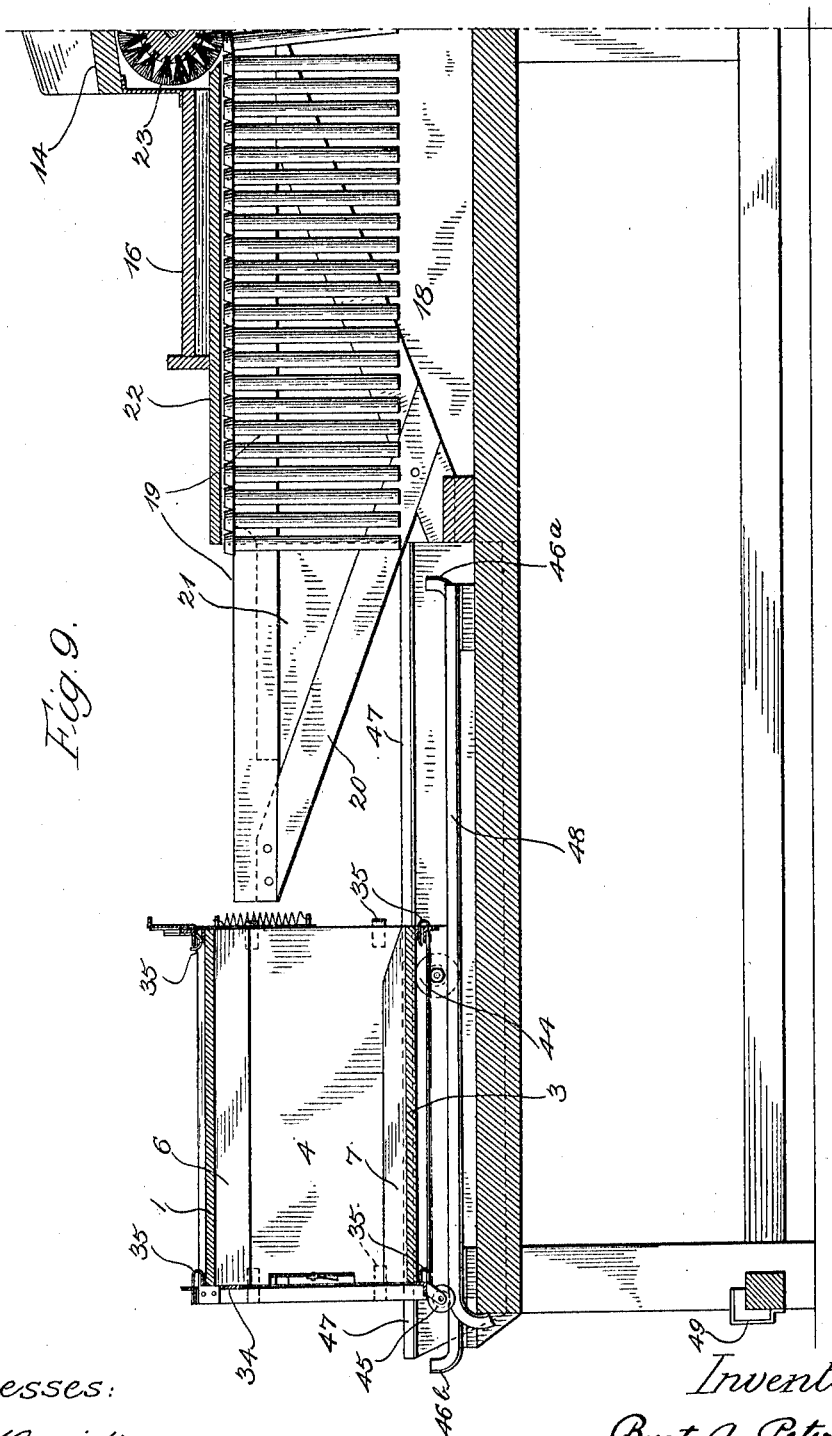

B. A. PETERSON.
MAGAZINE LOADER.
APPLICATION FILED MAY 12, 1910.
1,061,492.
Patented May 13, 1913.
7 SHEETS—SHEET 7.
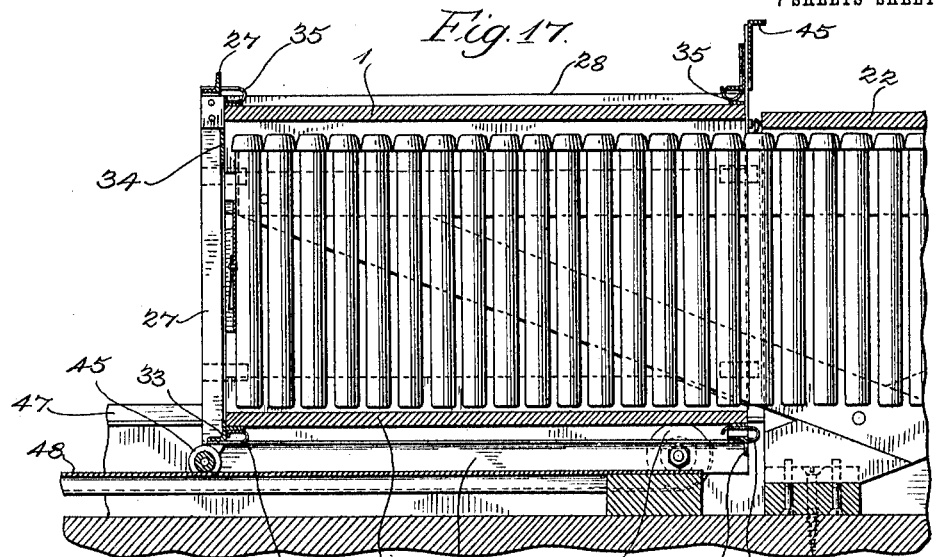
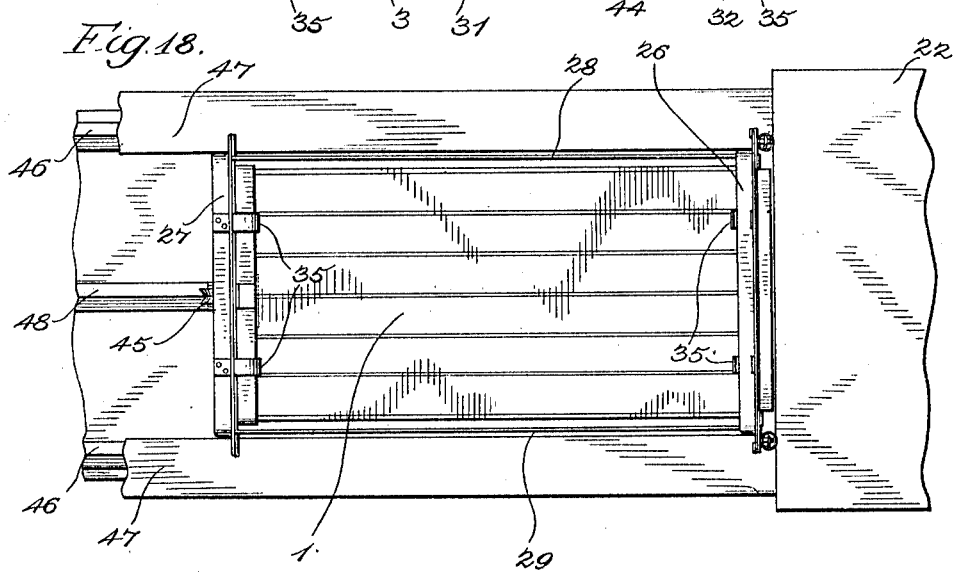
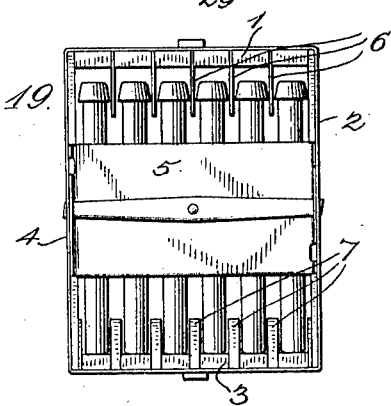
Witnesses:
J. C. Devick.
George L. Churdahl
Inventor:
Burt A. Peterson
By Luther L. Miller
Attorney.

UNITED STATES PATENT OFFICE.

BURT A. PETERSON, OF ROCKFORD, ILLINOIS, ASSIGNOR TO HOWARD D. COLMAN, LUTHER L. MILLER, AND HARRY A. SEVERSON, COPARTNERS DOING BUSINESS AT ROCKFORD, ILLINOIS, AS BARBER-COLMAN COMPANY.

MAGAZINE-LOADER.

1,061,492.  Specification of Letters Patent.  Patented May 13, 1913.

Application filed May 12, 1910.  Serial No. 560,900.

*To all whom it may concern:*

Be it known that I, BURT A. PETERSON, a citizen of the United States, residing at Rockford, in the county of Winnebago and State of Illinois, have invented certain new and useful Improvements in Magazine-Loaders, of which the following is a specification.

The object of this invention is the production of means for expeditiously filling bobbin magazines. The embodiment herein disclosed of the invention is intended for filling the magazines of bobbin doffers; that is to say, the magazines of machines for replacing the filled bobbins of spinning frames with empty bobbins.

The doffer to which the apparatus herein described is particularly designed to serve as an accessory is provided with a magazine adapted to contain a plurality of parallel rows of bobbins, all the bobbins being arranged with their head ends extending in the same direction.

The present embodiment of my invention comprises means for bringing the heads of a quantity of bobbins into a single plane, means for arranging the bobbins in parallel rows, and means for inserting the rows of bobbins into a magazine.

In the accompanying drawings, Figure 1 is a side elevation of an apparatus embodying the features of my invention. Figs. 2, 3, 4 and 5 are sectional views taken in the planes of dotted lines 2 2, 3 3, 4 4, and 5 5, respectively, of Fig. 1. Figs. 6 and 7 constitute a top plan view of the apparatus, a portion of the operator's platform at the front end of the machine being broken away. Figs. 8 and 9 represent a longitudinal vertical central section through the apparatus, Fig. 8 being taken in the plane of dotted line 8 8 of Fig. 6 and Fig. 9 being a view on line 9 9 of Fig. 7. Fig. 10 is a detail view illustrating the discharge position of the magazine carriage. Figs. 11, 12 and 13 are detail views of a means for retaining bobbins in the magazine while the magazine is being withdrawn out of operative relation to the bobbin-inserting means. Fig. 14 is a top plan view and Fig. 15 is a sectional detail of a means for alining the magazine with the bobbin-supporting rack. Fig. 16 is a perspective view of one of the members of said rack. Fig. 17 shows a portion of the devices illustrated in Fig. 9, but represents the magazine in its receiving position and as having been loaded with bobbins. Fig. 18 is a top plan view of the parts shown in Fig. 17. Fig. 19 is an end view of the magazine.

A magazine loader embodying my invention will correspond in details and dimensions with the form of magazine to be loaded. The magazine for which the present embodiment of my invention is especially designed is shown in Fig. 19, and consists of side walls 1, 2, 3 and 4 and has open ends. When in operative relation with a doffer, the bobbins within the magazine are supported upon devices forming a part of the doffer. To facilitate the handling of loaded magazines prior to their attachment to the doffer, the magazines are provided with removable bottoms 5 which are held in place by any suitable means. The bobbins are arranged within the magazine in six rows, the rows being separated from one another by partitions 6 and 7 extending between the rows of bobbins. The partitions 6 are attached to the side wall 1 of the magazine and extend between the heads of the bobbins, while the partitions 7 are attached to the side wall 3 and lie between the tips of the bobbins.

That embodiment of my invention which has been selected for illustration herein comprises a suitable framework 8. Upon said framework is arranged an inclined trough 9 at the upper end of which are located suitable bins 10 to receive a quantity of bobbins. An operator's platform 11 is arranged at the front end of the machine in position to afford convenient access to the trough 9 and the bins 10. The bottom of the trough has six longitudinal parallel slots 12 therein, which slots may be provided by forming the trough bottom of rails 13, the rails being spaced apart sufficiently to receive the body portions of the bobbins, but not far enough to permit the heads of the bobbins to pass through the slots or spaces between the rails.

The bobbins may be placed in the trough 9 in any suitable way. Preferably, however, the operator takes a double-handful of bobbins from one of the bins 10, picking the bobbins up so that they will lie substantially parallel with one another; lays the handful of bobbins in the trough so that the bobbins extend substantially parallel with the slots 12; and spreads the handful of bobbins laterally. The bobbins thereupon swing downward into the slots and hang upon the rails 13 with their heads uppermost. The bobbins thus become sorted out into six rows with all the bobbins arranged with their head-ends up. The bobbins meanwhile continue sliding down the inclined trough until they reach the lower end thereof or stop against the rows of bobbins extending upwardly from the lower end of the trough.

It occasionally happens that a bobbin does not enter one of the slots 12, but rolls down the trough. To divert such bobbins from the trough I provide an inclined runway 14 the upper end of which is adjacent to the bottom of the trough 9 at a suitable distance from the ends of the latter. The space between the upper end of the runway 14 and the trough bottom is wide enough to permit positioned bobbins to pass beneath the runway, but too narrow to permit a bobbin to roll beneath the runway. When the runway 14 is of wood, its upper end may be reinforced by a sheet-metal covering 15. At the lower end of the runway is an inclined chute 16 which receives bobbins rolling off the lower end of the runway, and directs them into a bin 17 or other suitable receptacle (see Figs. 5 and 7).

To facilitate the introduction of bobbins into the magazine, there is provided, in the present embodiment, a horizontal bobbin rack 18 connected to the lower end of the trough 9 so that rows of bobbins may pass down the trough and onto the rack. (Figs. 1, 5 and 9). The rack 18, in this instance, comprises five horizontal rails 19 each connected at one end with one of the rails 13. In the construction herein illustrated the rails 13 extend downwardly beyond the point of attachment of the rails 19 with the rails 13, and the rear ends of the rails 19 are supported by inclined braces 20 (Fig. 9) attached to the lower ends of the rails 13. At the opposite sides of the series of rails 19 are two relatively thin plates 21, said plates being used instead of rails in order to save space; the rear end of the rack 18 is of such size as to fit within a magazine, as will appear hereinafter. The braces 20, the lower ends of the rails 13 and the plates 21 form partitions for preventing sidewise displacement of bobbins. Above the rack 18 is a plate 22 spaced above the rails 17 just sufficiently to permit the heads of the bobbins to move freely, but preventing said heads from riding up on one another as the rows of bobbins are pushed along in the rack.

I have herein shown mechanical means for moving the rows of bobbins along the rack in the operation of inserting the bobbins in the magazine. The means herein shown consists of a rotatable brush 23 arranged to make peripheral contact with the heads of the bobbins and thus push them along the rails 19. In this instance, the rotatable brush comprises a core (Fig. 2) having its periphery provided with suitable brush material. The brush 23 is fixed upon a shaft 24 which is mounted in bearings adjacent to the juncture of the trough 9 and the rack 18, said shaft being herein shown as arranged for manual rotation by means of a crank 25.

To facilitate the handling of the magazine, I may provide a carriage adapted to receive the magazine. In this instance, the carriage is shown as consisting of two end frame members 26 and 27 and the connecting bars 28 29 30 31 32 33. See Figs. 4, 17 and 18. A magazine may be inserted into the carriage through the forward end of the latter, a bar 34 in the carriage serving as a stop when the magazine is fully inserted. The magazine is yieldingly mounted in the carriage, for a reason to appear later herein, upon springs 35 attached to the carriage frame, as shown in Figs. 4, 10, 17 and 18. Eight of these springs are attached to the front end of the carriage and another set of eight springs to the rear end of the carriage, the springs being located so as to contact the sides 1, 2, 3 and 4 of the magazine at the front and rear ends of the latter.

A gate 36 is slidably mounted upon the front end of the carriage by means of side arms 37, said arms having flanges 38 (Fig. 12) that slidably embrace the vertical edges of the frame member 26. Pins 39 fixed in the said frame member extend through slots 40 and limit the movement of the gate with relation to the carriage. Springs 41 tend to hold the gate in the position shown in Fig. 4. Upon the lower edge of the gate 36 are projections 42 (Fig. 11) adapted to enter the heads of bobbins. Upon the upper edge of the gate is a flange 43 affording means for manually depressing the gate against the action of the springs 41. When the gate 36 is lowered the magazine is held against withdrawal from the carriage.

The carriage is supported upon two rollers 44 at its forward end and a roller 45 at its rear end. The rollers 44 are arranged to travel upon rails 46, said rails having upturned front and rear ends 46$^a$ 46$^b$ (Fig. 9) to form stops to limit the movement of the carriage.

47 are guard rails to prevent displacement of the rollers 44. For the roller 45 there is provided a rail 48. The rails 46 and 48 are arranged in a horizontal plane to permit of movement of the carriage in a straight line toward and away from the discharge end of the rack 18, the carriage and the magazine being advanced to receive bobbins and being moved rearwardly after the magazine has been filled. To facilitate the insertion of the empty magazine into the carriage, and the removal of the magazine after loading, the carriage is supported so that it may be turned in a vertical plane through ninety degrees. For this purpose the rail 48 is made of such length that the roller 45 will run off said rail and thus permit the rear end of the carriage to descend as the operator moves the carriage rearwardly upon the rails 46 and 48. When the rollers 44 stop against the upturned rear ends 46^b of the rails 46, the carriage has assumed the position shown in Fig. 10, the roller 45 resting against a stop 49 upon the frame. A magazine may now be withdrawn from or inserted into the carriage through the upper end of the latter.

It will be evident that the magazine-supporting carriage may be readily dispensed with, and that the magazine may be manually slid upon a suitable support into and out of operative relation with the rack 18.

In order that the bobbins may be kept in vertical position, and in rows, until fully inserted into the magazine, the rails 19 are of such length that the magazine may be passed onto said rails as shown in Fig. 17. To insure alinement of the rows of bobbins in the rack with the compartments in the magazine, the rails 19 have grooves 50 in their upper edges to receive the lower portions of the partitions 6. See Figs. 4 and 11. The entrance ends of the grooves 50 may be slightly flaring as indicated in Fig. 14. The springs 35 permit the magazine to move slightly with relation to the carriage, and thus adjust its position with relation to that of the rails 19.

In use, an operator standing at the front end of the apparatus takes bobbins from the bins 10 and lays them in the trough 9. The bobbins become arranged in rows with their head-ends up, as hereinbefore explained. A magazine having been inserted into the carriage, the latter is advanced upon the rails 46 48 until the magazine has been passed onto the rails 19. The operator then rotates the rotary brush 23, said brush engaging the heads of the bobbins and pushing the rows of bobbins rearwardly and into the magazine. When the magazine has been loaded, the operator depresses the gate 36 so as to close the magazine against the removal of bobbins therefrom, and, then, still holding the gate down, he moves the carriage rearwardly, thus withdrawing the magazine and the bobbins therein from the rails 19. The operator then lets the carriage down into the position shown in Fig. 10 and lifts the magazine out of the carriage.

I am aware that various changes may be made in the embodiment herein illustrated, without departing from the invention, therefore no undue limitation should be understood from the foregoing detailed description.

I claim as my invention:

1. In a magazine loader, in combination, means for supporting a magazine adapted to contain a row of bobbins; means for supporting a row of bobbins; and means for moving the row of bobbins as a unit into the magazine.

2. In a magazine loader, in combination, means for supporting a magazine adapted to contain a row of bobbins; means for supporting a row of bobbins in alinement with the receiving end of a magazine placed on its support; and means for pushing the row of bobbins as a unit into the magazine.

3. In an apparatus for loading bobbins into a magazine having longitudinal spaces to receive rows of bobbin-butts, and opposite narrower longitudinal spaces to receive rows of bobbin-tips, the combination of means to support such a magazine and means to position bobbins adjacent to the magazine for entrance into said spaces.

4. The combination of a rack on which a row of bobbins may be supported by their heads, and means for removably supporting a magazine with its receiving end adjacent the discharge end of the rack.

5. In a magazine loader, in combination, a rack adapted to support a plurality of rows of bobbins, and means for supporting a bobbin magazine adjacent said rack, one end of said rack being arranged to enter a magazine supported by said means.

6. In a magazine loader, a support adapted to hold a plurality of rows of bobbins, one end of said support being adapted to be associated with a magazine to be loaded, the bobbins being guided by said support until the bobbins are within the magazine.

7. In a magazine loader, a bobbin support comprising a plurality of parallel bars adapted to receive bobbins therebetween, said bars at one end being adapted to be associated with a magazine to be loaded, the bobbins being slidable along said bars into the magazine.

8. In a magazine loader, in combination, a rack comprising a plurality of parallel bars spaced apart, said bars being arranged to receive bobbins therebetween and slidably support the bobbins by their heads; means for sliding the bobbins along said rack; and a plate lying above and close to said bars, said plate serving to prevent the bobbins upon said bars from riding up on one another.

9. In a bobbin-magazine loader, the combination of an inclined hopper-like structure, inclined bobbin-sorting means within and extending outwardly from said structure, and means for supporting a magazine so as to inclose the outer portion of said sorting means.

10. In a magazine loader, the combination of a bobbin-sorting receptacle, means for supporting a bobbin magazine, guide means between said receptacle and said magazine-supporting means, and means for moving the sorted bobbins from said receptacle into a magazine supported by said magazine-supporting means.

11. In a magazine loader, the combination of a bobbin-sorting receptacle, a rack connected to the lower portion of said receptacle and arranged to receive the sorted bobbins from said receptacle, and a rotary device located adjacent to the junction of the rack and the receptacle and arranged for peripheral contact with the bobbins to move said bobbins along said rack.

12. In a magazine loader, the combination of a bobbin-sorting receptacle in which the bobbins are sorted into parallel rows, a rack arranged to receive the rows of bobbins from said receptacle, and a rotary brush arranged for peripheral contact with the bobbins to slide the rows of bobbins along said rack.

13. The combination of means for supporting a rectangular open-end magazine having bobbin-receiving spaces therein, and means for assembling a plurality of rows of bobbins adjacent to the open end of the magazine and in alinement with said spaces.

14. In an apparatus for loading bobbins into a magazine adapted to receive bobbins through one of its ends, and arranged to hold bobbins extending transversely of the magazine, the combination of means to support such a magazine, and means to position bobbins adjacent to the inlet end of the magazine with their tips extending in the same direction and transversely of the magazine.

15. In a magazine loader, the combination of means for supporting a plurality of bobbins in definite relation to each other; a magazine carriage having an open end; and a track on which said carriage is movable into and out of operative relation to said supporting means, said carriage being movable at one end of said track into a position with its open end uppermost.

16. In a magazine loader, in combination, means for supporting a plurality of rows of bobbins, a magazine carriage movable into and out of operative relation to said means, said carriage having an open end; means for closing said open end; and means adapted normally to hold said closing means in its inoperative position.

17. In a magazine loader, in combination, means for supporting a plurality of rows of bobbins; a magazine carriage movable into and out of operative relation to said means; a gate slidably mounted on said carriage for closing one end thereof; and means tending to hold said gate in its open position.

18. The combination of a rack adapted to support a plurality of rows of bobbins, a carriage arranged to travel to and from said rack, means attached to said carriage for yieldingly supporting a magazine, the carriage being movable to cause the magazine therein to receive one end of said rack, and means on the carriage for holding the bobbins in said magazine.

19. In a magazine loader, in combination, a bobbin-sorting receptacle; means to receive the sorted bobbins from said receptacle; means for supporting a magazine in alinement with said receiving means; and means for moving the bobbins from the first mentioned means into the magazine.

20. In a magazine loader, in combination, a bobbin-sorting receptacle in which the bobbins are sorted into rows; means to receive the rows of bobbins from said receptacle; means for supporting a magazine in operative relation to the first mentioned means; and means for sliding the bobbins along said first mentioned means and into the magazine.

21. In a magazine loader, a bobbin-sorting trough comprising an inclined slotted bottom wall, an inclined runway extending into said trough from the lower end thereof, the upper edge of said runway lying adjacent said bottom wall, and a chute at the lower end of said runway.

22. In a magazine loader, in combination, an inclined bobbin-sorting trough; a bobbin rack communicating with the lower end of said trough; an inclined runway extending into said trough, the upper end of said runway lying adjacent the bottom of the trough; and means beneath said runway arranged to engage the bobbins and move them along said rack.

23. In a magazine loader, a bobbin-sorting trough, the bottom wall of which is inclined and slotted so that bobbins placed in said trough may move downward by gravity and may enter the slots in said bottom wall and hang by their heads on said wall; means at the lower end of said trough for receiving the sorted bobbins therefrom; and a runway extending into said trough and adapted to receive bobbins which fail to enter said slots.

24. In a magazine loader, in combination, a supporting frame; an inclined bobbin-sorting trough at one end of said frame; a rack communicating with the lower end of said trough and arranged to receive the sorted bobbins therefrom; a rotary brush adjacent the juncture of said trough and said rack, said brush being adapted for peripheral contact with the bobbins for moving them along said rack; and a magazine carriage mounted upon the rear end of said supporting frame, said carriage being movable into operative relation to the rear end of said rack, so that rotation of said brush will move the bobbins along said rack and into a magazine supported by said carriage.

25. In a magazine loader, in combination, a supporting frame; an inclined bobbin-sorting trough at the forward end of said frame; a rack communicating with the lower end of said trough and arranged to receive the sorted bobbins therefrom; a rotary brush adjacent the juncture of said trough and said rack, said brush being adapted for peripheral contact with the bobbins for moving them along said rack; and means at the rear end of said supporting frame for supporting a magazine in operative relation to said rack.

26. The combination of means for supporting an open-end magazine having bobbin-receiving spaces therein, and means for simultaneously moving into the open end of said magazine a plurality of parallel rows of bobbins.

27. In a magazine loader, means for supporting a row of sorted bobbins, and means for supporting a magazine for longitudinal movement toward and away from said row-supporting means, the latter being adapted to extend into a magazine placed on said supporting means.

BURT A. PETERSON.

Witnesses:
 FLOYD C. MITCHELL,
 LOUISE A. CULVER.

Copies of this patent may be obtained for five cents each, by addressing the "Commissioner of Patents, Washington, D. C."